United States Patent [19]
Dulaney

[11] 4,203,472
[45] May 20, 1980

[54] DEVICE FOR STOPPING FLUID FLOW FROM A PIPE

[76] Inventor: Burrell C. Dulaney, 806 Invader St., Sulphur, La. 70663

[21] Appl. No.: 917,303

[22] Filed: Jun. 20, 1978

[51] Int. Cl.$^2$ .............................................. F17D 1/16
[52] U.S. Cl. ....................................... 137/828; 137/13; 137/340; 166/57; 166/302
[58] Field of Search ......................... 137/13, 828, 340; 166/57, 61, 302

[56] References Cited

U.S. PATENT DOCUMENTS

| | | | |
|---|---|---|---|
| 2,929,451 | 3/1960 | Hurlstone et al. | 166/303 |
| 3,228,471 | 1/1966 | Shook | 166/61 X |
| 3,343,605 | 9/1967 | Phelan | 166/61 |
| 3,738,424 | 6/1973 | Osmun et al. | 166/57 X |
| 3,811,510 | 5/1974 | Rogers et al. | 166/302 |
| 3,885,629 | 5/1975 | Erb | 166/302 |
| 3,989,108 | 11/1976 | Allen | 166/306 X |
| 4,082,109 | 4/1978 | Sun et al. | 137/13 X |

*Primary Examiner*—William R. Cline
*Attorney, Agent, or Firm*—Clarence A. O'Brien; Harvey B. Jacobson

[57] ABSTRACT

An apparatus for stopping the fluid flow through a pipe by freezing the fluid. The apparatus is for use especially in oil wells, gas wells, and the like. A head of arcuate shape has inwardly radially extending fingers whose purpose is to locate the pipe in the center of the head. The head is securely attached to a bar for supporting and transporting the entire device. The head has attached thereto a supply tube with jets radially extending from the supply tube toward the pipe. The jets supply a pressurized refrigerant about the periphery of the pipe, this refrigerant lowers the temperature of the pipe sufficiently to freeze the contents and thus stops the flow within the pipe.

12 Claims, 5 Drawing Figures

DEVICE FOR STOPPING FLUID FLOW FROM A PIPE

BACKGROUND OF THE INVENTION

1. Field of the Invention

The present invention relates to devices used for sealing off wells, such as those producing oil or gas in the event of a blowout.

2. Description of the Prior Art

Presently, well heads are provided with mechanical blowout preventers of the sleeve-type and/or of the double ram type which are operated by hydraulic controls. However, due to human and mechanical failure, these preventers are not always operated in time to prevent the blowout and, unfortunately, uncontrolled eruptions of gas and oil are still occurring. Therefore, devices are needed which will stop a blowout after it has occurred.

U.S. Pat. No. 3,885,629 to Erb discloses just such a device. Here, the well head is tapped into and a branch line connected to supply liquid carbon dioxide or nitrogen under pressure. When a blowout occurs, a valve is opened which allows the carbon dioxide or nitrogen to mix with the fluid in the pipe. This produces a freezing of the liquid and thus stops the blowout. U.S. Pat. No. 3,738,424 to Osmun et al. also shows a similar freezing technique. Here a special freeze joint is incorporated in the piping. Two valves are supplied, one at the top of the freeze joint and one at the bottom of the freeze joint, and a refrigerant is circulated through the freeze joint by use of these valves. By this means, the fluid in the pipe is frozen and the blowout can be controlled.

Other prior art which demonstrates cooling of well pipes include U.S. Pat. No. 3,811,510 Rogers et al. which discloses the cooling of well fluids prior to the passage to a pump, whereby pumping efficiency can be increased. Also, U.S. Pat. No. 3,989,108 to Allen demonstrates a method for preventing water from entering a well in communication with a subterranean hydrocarbon reservoir by injecting a cold fluid which freezes the water forming ice barrier of the fluid flow. U.S. Pat. No. 2,929,451 to Hurlstone et al discloses a method and apparatus for freeing paraffin and asphalt and other obstructions in oil wells, and the like, by forcing heated fluid through a tube to melt the obstructing material.

SUMMARY OF THE INVENTION

The invention contemplates an apparatus which can be quickly moved into place in the event of a blowout for stopping the blowout by freezing the liquid in the pipe.

Another object of the invention is to provide an apparatus for freezing liquids in pipe which does not have to be permanently attached to the pipe, thus reducing the cost of drilling by avoiding the necessity of having a freezing apparatus associated with every drilling pipe.

A still further object of the invention is to provide an apparatus for freezing the fluid flow in a pipe which apparatus may be operated at a substantial distance from the pipe having the blowout thus precluding the dangers inherent in approaching such a pipe.

Another object of the invention is to provide an apparatus wherein jets which supply refrigerant to the outer wall of a pipe for freezing the contents thereof are protected by an arcuate ring having fingers longer than the jets, which fingers serve to located the pipe in the center of the jets and also protect the jets from damage.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
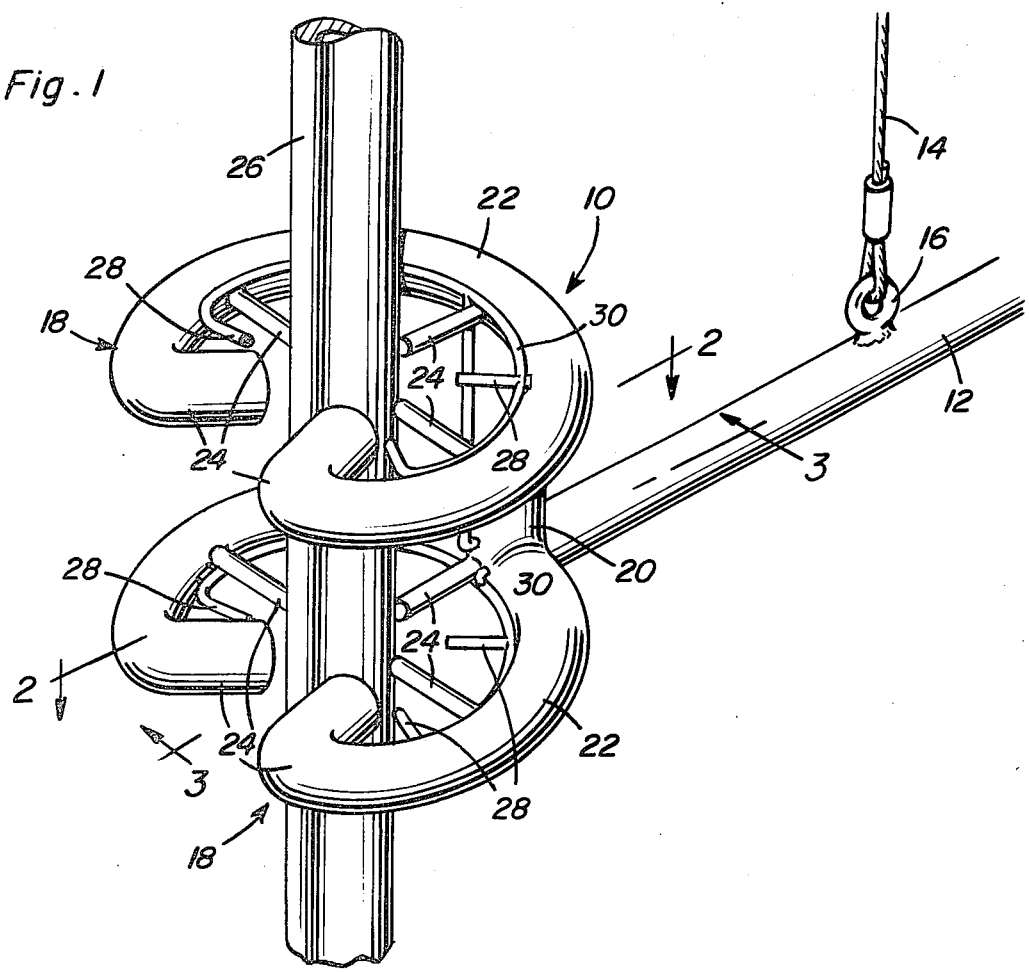
FIG. 1 is a perspective view of the device of this invention disposed in operative relation to a well pipe.

With reference to the drawings, the fluid flow stopping device of the present invention is generally referred to by the numeral 10. The device has a cylindrical arm 12 used to vertically support it. Attached to arm 12 may be wheels, a crane or, as shown in FIG. 1, a lift cable or sling 14 attached to eyelet 16 which is permanently attached to the arm 12.

The device as shown is composed of two application heads 18. The use of two heads in the drawings is shown for convenience only. One head may be used, if desired, or any number of additional heads may be used as conditions warrant. As shown, the heads are attached by a hollow cylindrical member 20.

As shown, each head has an arcuate support member 22. Attached to member 22 and extending essentially radially inward are protective fingers 24. These protective fingers 24 include two fingers on the end of the support member which converge inwardly and form a guide for the device when being positioned about pipe 26. After initial positioning, the fingers tend to hold the pipe in the center of the device. Additionally, each head is provided with a series of jets 28 which extend radially inward and through which refrigerant flows and is sprayed onto pipe 26. These jets extend radially inward toward pipe 26 a distance which is less than that of fingers 24, thus fingers 24 act to protect the jets from damage when the device is positioned about pipe 26. Any movement of the head would cause the pipe to hit the protective fingers rather than the jets.

Refrigerant is supplied to the jets of each head through a separate line. Each head has a substantially identical supply tube 30 connecting the jets 28. Each supply tube 30 is connected to its corresponding support member 22 by means of welds 34 or any other adequate attachment device. Supply tube 30 for the upper head has attached thereto connecting tube 32 which connects the supply tube with a source of refrigerant, such as, for example, liquid hydrogen or liquid carbon dioxide, or any other suitable refrigerant. Supply tube 30 on the lower head has a similar connecting tube 36 connecting it to the source of refrigerant. Tubes 32 and 36 are run through the center of cylindrical arm 12 to the source of refrigerant. Each tube has a separate valve connected thereto in order to provide versatility to the device. For example, both heads may be placed in operation to initially freeze the contents of the pipe. When the liquid in the pipe is sufficiently frozen to stop the flow therethrough, one of the valves may be shut off thus leaving only one head in operation to maintain the frozen state thus conserving refrigerant.

Figure 5:
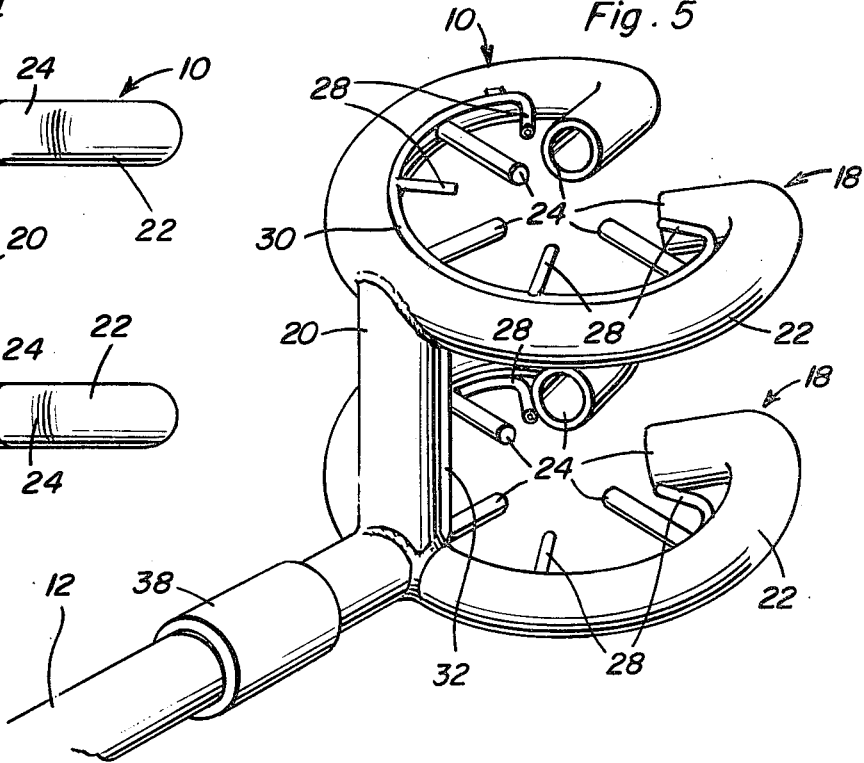
FIG. 5 is a perspective view of the device as provided with a coupling for interchanging heads.

In FIG. 5 it can be seen that coupling 38 has been added to cylindrical arm 12. Modifications such as this may be made to increase the versatility of the device. With the addition of a coupling such as 38, heads 18 may be quickly removed and replacement heads attached to provide for use with either a different size pipe or to provide a different number of jets to increase the freezing capability of the device. Flexible couplings must be provided along with coupling 38 as a part of the connecting tubes in order to change heads. Other modifications to the device which are readily apparant include the addition of a coupling on a vertical member 20 to facilitate the addition and removal of the second head. Also, additional vertical members could be provided on the heads to provide for the connection of additional heads. Additional heads could be supplied by connecting tubes 32 or 36 or additional connecting tubes could be provided for the device.

Figure 2:
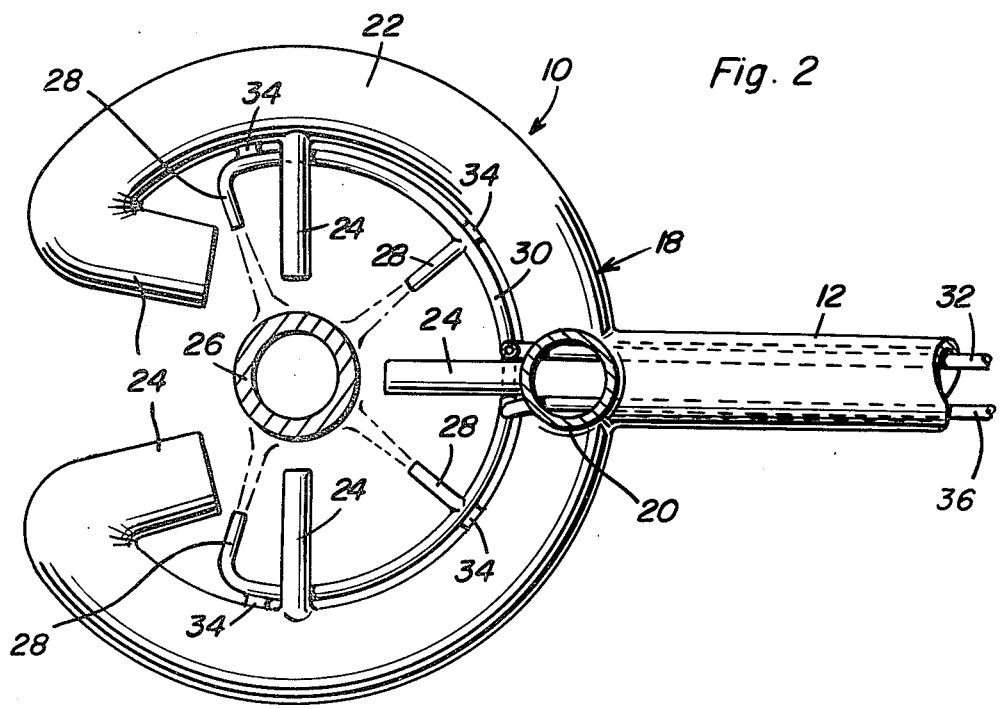
FIG. 2 is a sectional view taken substantially upon a plane passing along section line 2—2 of FIG. 1, illustrating the device of this invention in operation.
Figure 3:
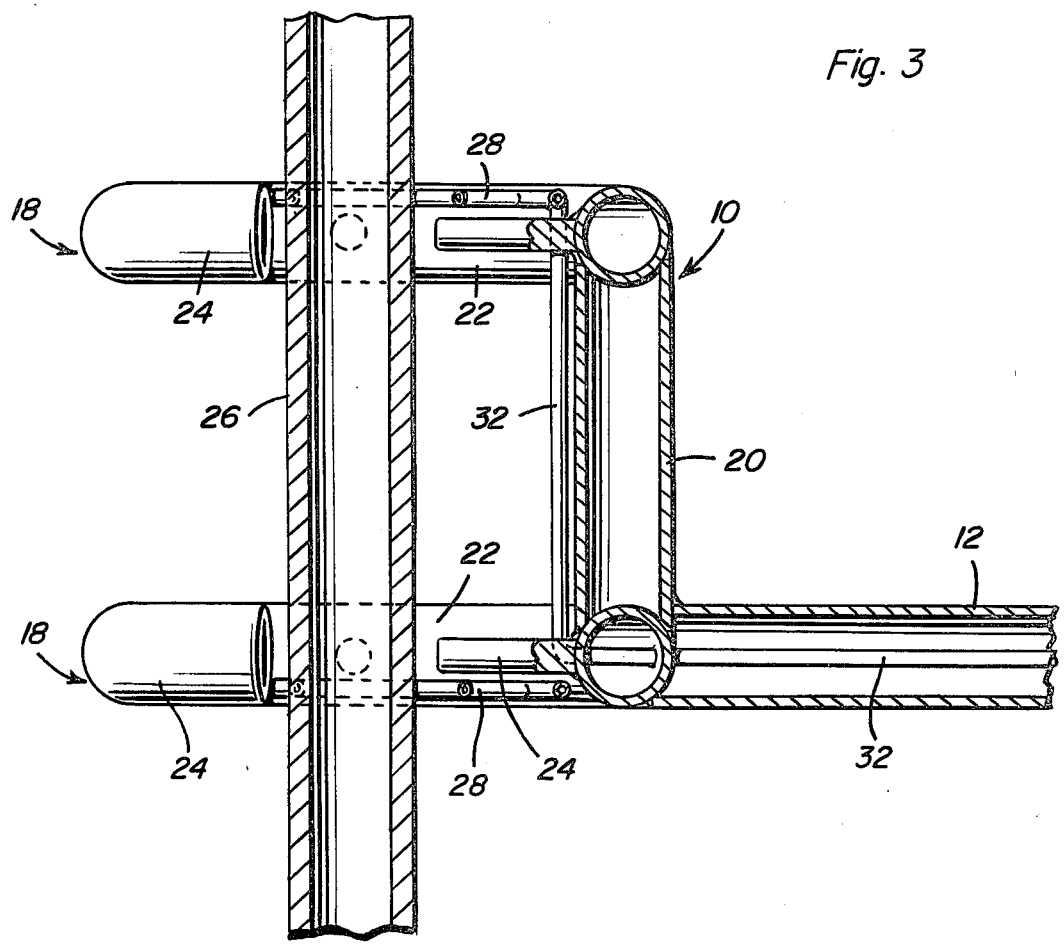
FIG. 3 is a sectional view taken substantially upon a plane passing along section line 3—3 of FIG. 1.
Figure 4:
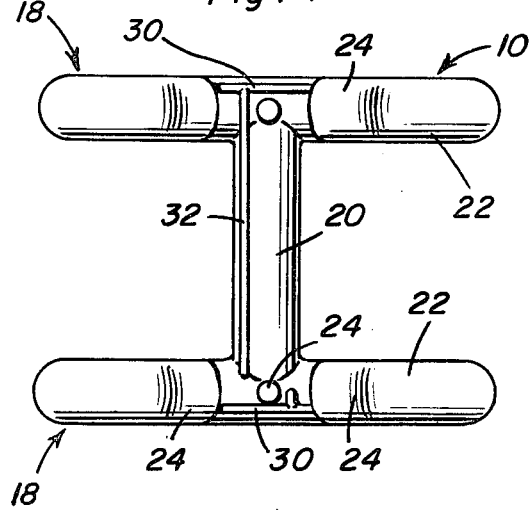
FIG. 4 is an elevational view of the device taken from the front.

In operation, the device could be maintained permanently in position about the drilling pipe or it could be stored in the vicinity of the pipe for use therewith in the event of blowout. If a blowout were to occur, the device would be moved into place by wheels, a sling, or a crane attached thereto. The device would be positioned about the periphery of the well pipe in the space defined by the protector fingers 24. At this point, the valves (not shown) used to supply refrigerant to the separate heads would be opened fully. Refrigerant would be sprayed upon the drilling pipe as shown in FIG. 2 whereupon the contents of the pipe would be frozen by expansion and vaporization of the liquid refrigerant thereby producing a frozen slug which would plug the flow of liquid through the pipe. With a solidly frozen slug in place, one of the valves could be turned off, thus leaving only one head to maintain the frozen state of the slug. All of the above could be performed by personnel positioned several hundred feet away from the pipe. For example, in an offshore well drilling operation, the device could be placed around the wellhead, below the required blowout preventers, with the refrigerant supply lines extending to the edge area of the rig platform. Thus the dangers to personnel inherent in the operations needed to control a blowout would be avoided.

The foregoing is considered as illustrative only of the principles of the invention. Further, since numerous modifications and changes will readily occur to those skilled in art, it is not desired to limit the invention to the exact construction and operation shown and described, and accordingly, all suitable modifications and equivalents may be resorted to, falling within the scope of the invention.

What is claimed as new is as follows:

1. Portable apparatus for use in stopping fluid flow from a pipe comprising: a first application head comprising a main support member of arcuate shape, a plurality of protective fingers extending radially inward from said main support head, a supply tube of arcuate shape concentric with and attached to said support head, a plurality of jets extending radially inward from said supply tube with the protective fingers extending radially inward a greater distance than said jets; means supporting said head; and means for supplying a refrigerant to said supply tube.

2. The apparatus as claimed in claim 1 and further comprising a second application head substantially identical to the first disposed directly above said first head and an elongated vertically extending member which is attached at one end to said first head and at the other end to said second head and means for supplying refrigerant to the supply tube of said second head.

3. The apparatus of claim 1 and further in combination with a well pipe wherein said head is disposed about the periphery of said pipe with said jets being aimed at said pipe to supply pressurized refrigerant to said pipe to freeze the contents thereof.

4. The apparatus of claim 1 wherein said main support member has at least one of said fingers at each end thereof to define an opening through which a pipe may be passed.

5. An apparatus for stopping well fluid blowout from the upper end of a well pipe comprising: support means extending peripherally about at least a substantial portion of the well pipe in surrounding relation thereto, said support means being spaced from the periphery of the well pipe and having one opening formed therein for enabling said support means to be moved laterally of said well pipe into and out of said surrounding relation; at least one heat exchange fluid discharge means mounted on said support means, said discharge means being directed toward the well pipe for discharging heat exchange fluid onto the peripheral surface of the well pipe to reduce the temperature of well fluids passing therethrough to a temperature below their solidification temperature whereby stopping flow thereof from the upper end of the well pipe.

6. The apparatus as defined in claim 5 wherein said support means includes a pair of vertically spaced connected frames.

7. The apparatus as defined in claim 6 wherein each of said frames is annular in configuration.

8. The apparatus as defined in claim 7 wherein said discharge means includes a plurality of nozzles directed radially inward of one of said annular frames.

9. An apparatus stopping well fluid blowout from the upper end of a well pipe comprising support means extending peripherally about at least a substantial portion of the well pipe, said support means being spaced from the periphery of the well pipe, at least one heat exchange fluid discharge means mounted on said support means, said discharge means being directed toward the well pipe for discharging heat exchange fluid onto the peripheral surface of the well pipe to reduce the temperature of well fluids passing therethrough to a temperature below their solidification temperature thereby stopping flow thereof from the upper end of the well pipe, wherein said support means includes a frame member extending peripherally of the well pipe, said frame member including terminal ends spaced apart to enable movement of the well pipe onto the interior of the frame member, said frame member extending around a major portion of the periphery of the well pipe, and a plurality of heat exchange fluid discharge means spaced from said at least one discharge means and spaced circumferentially around the well pipe, each discharge means including a jet for discharging liquid refrigerant onto the pipe with expansion and vaporization of the refrigerant cooling the pipe.

10. The apparatus as defined in claim 9 wherein said support means also includes a laterally extending support member rigid with said frame member to enable positioning of the frame member around the pipe from a remote location, and supply conduit means for the liquid refrigerant extending along the support member and frame member and connected with said jets.

11. The apparatus as defined in claim 9 wherein said frame member includes a plurality of inwardly extending circumferentially spaced projections to centralize the well pipe within the frame member.

12. The apparatus as defined in claim 9 wherein the terminal ends of the frame member include inwardly converging guide extensions for guiding the frame member onto the well pipe when moved laterally toward the pipe.

* * * * *